UNITED STATES PATENT OFFICE.

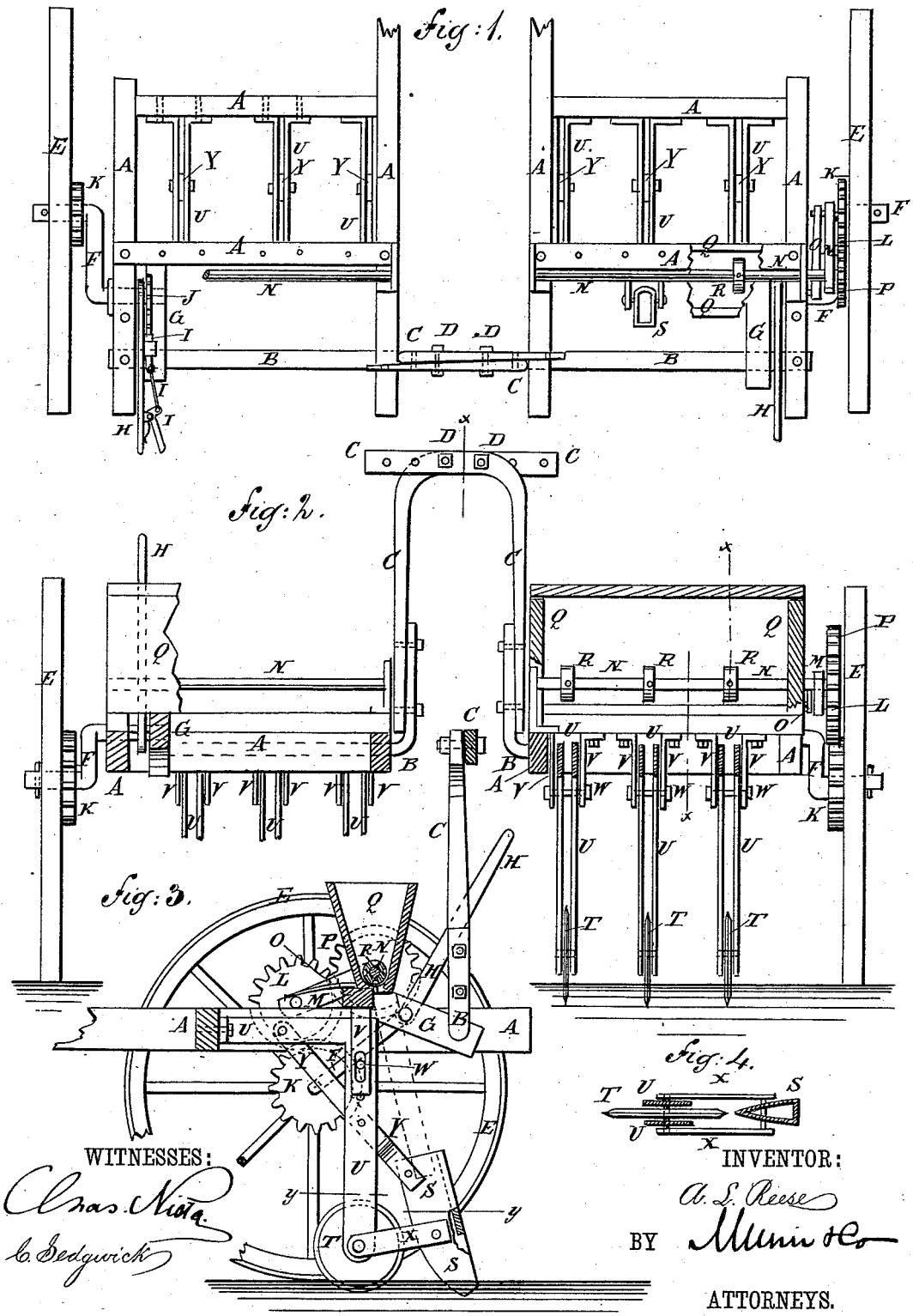

ABRAM L. REESE, OF CHASE, KANSAS.

GRAIN-DRILL.

SPECIFICATION forming part of Letters Patent No. 300,129, dated June 10, 1884.

Application filed September 27, 1883. (No model.)

*To all whom it may concern:*

Be it known that I, ABRAM L. REESE, of Chase, in the county of Rice and State of Kansas, have invented a new and useful Improvement in Grain-Drills, of which the following is a full, clear, and exact description.

Reference is to be had to the accompanying drawings, forming a part of this specification, in which similar letters of reference indicate corresponding parts in all the figures.

Figure 1 is a plan view of a part of a grain-drill to which my improvement has been applied, parts being broken away. Fig. 2 is a sectional front elevation of the same, parts being broken away. Fig. 3 is a sectional side elevation of the same, taken through the broken line $x\ x\ x$, Fig. 2. Fig. 4 is a sectional plan view of the colter-standard and the shoe, taken through the line $y\ y$, Fig. 3.

This invention relates to certain improvements on my improved wheat-drill for which Letters Patent were granted to me April 4, 1882, No. 256,049, and March 20, 1883, No. 274,380; and the invention consists in certain details of construction, as will be hereinafter fully described, and specifically set forth in the claims.

The wheels are provided with crank-axles, and are connected with the feed-shafts by gear-wheels, the intermediate wheels being journaled to bars swinging upon the feed-shafts and pressed forward by springs to keep the wheels in gear, however the said wheels may be adjusted. To the crank-axles are rigidly attached levers, for readily turning the axles to raise and lower the frame of the machine. To the frame of the machine are attached the ends of the upper arms of right-angled standards, which are connected at their angles with the said frame by supporting-braces, and have rotary colters pivoted to their lower ends. With the standards are connected by bars the shoes, which are made triangular in cross-section, with sharp rounded forward edges, and with interior passages, whereby the soil is pressed back to form space for the seed, and the seed is conducted into the said spaces, as will be hereinafter fully described.

A represents the frame of the drill, which is made in two parts placed at such a distance from each other as will allow a row of plants to pass between them.

To the rear ends of the side bars of the frame A are attached two bars, B, the inner ends of which, at the inner sides of the parts of the frame A, are bent upward at right angles, and to the said ends are attached the lower ends of the upright bars C. The upper ends of the bars C are bent at right angles, so as to overlap each other, and are secured to each other by bolts D. Several holes are formed in the horizontal upper ends of the bars C, so that the upright parts of the said bars and the parts of the frame A can be adjusted at any desired distance apart. Each bar B C can be made in two parts, bolted together as shown in Figs. 2 and 3, or in one piece, as may be desired.

E are the wheels, which revolve upon the outer arms of the crank-axles F, the inner arms of which rock in bearings in the outer side bars of the outer parts of the frame A, and in the short bars G, secured to the said frame near to and parallel with the said outer side bars.

To the upper arms of the crank-axles F are rigidly attached levers H, so that the said axles can be adjusted to raise and lower the frame A, to regulate the depth at which the seed is placed in the ground, and to raise the drilling mechanism away from the ground. The levers H are provided with ordinary spring-lever pawls, I, and catch-bars J, for holding the said levers, axles, and frames in any position into which they may be adjusted.

To the inner sides of the wheels E, or to the inner ends of the hubs of the said wheels, are attached gear-wheels K, into the teeth of which mesh the teeth of the gear-wheels L. The gear-wheels L are pivoted to the outer ends of short arms M, the inner ends of which are pivoted to and ride upon the outer ends of the shafts N. The gear-wheels L are held in gear with the gear-wheels K by springs O, attached to the frame A, and which press against the bars M, that carry the said gear-wheels L. The teeth of the gear-wheels L mesh into the teeth of the gear-wheels P, attached to the shafts N, so that the said shafts will be driven from the wheels E, however the crank-axles F may be adjusted. The shafts N revolve in bearings in the ends of the seed-boxes Q, or attached to the frame A, and should be provided with seed-dropping wheels R, or other suitable means for removing the seed from the said seed-boxes and dropping it into a conducting-spout, (shown in dotted lines in Fig. 3,) through which it passes into the interior of the shoes S, and thence to the ground. The seed-boxes Q are made in two parts, in the same manner as the frame A, so that the said boxes will not interfere with the plants as the machine is drawn along a row. The shoes S are triangular in cross-section, as shown in Fig. 4, with a sharp forward edge, so that the said shoes will act as wedges to force back the sides of the cut made by the colters T, and thus form spaces to receive the seed, the said seed being covered by the falling in of the soil in the rear of the said shoes. The colters T are made circular, and are pivoted to the lower ends of the double standards U, which are made with rigid arms projecting forward from their upper ends. The forward ends of the upper arms of the right-angled standards U are secured to the forward cross-bars of the two parts of the frame A. The standards U are supported by the braces V, the upper ends of which are bolted to cross-bars of the parts of the frame A, and their lower ends are bolted to the said standards a little below their angles. The lower parts of the braces V are slotted, and the standards U have a number of holes formed through them to receive the fastening-bolts W, so that the said standards U can be readily adjusted to cause the colters T to work deeper or shallower in the ground, as may be desired. The shoes S are supported in position and held against the draft-strain by the bars X Y. The rear ends of the bars X are attached to the shoes S a little below their centers, and their forward ends are attached to the lower ends of the standards U, or to the journals of the colters T. The rear ends of the bars Y are attached to the upper forward corners of the shoes S. The bars Y incline upward and forward, and are attached to the arms of the standards U, as shown in Fig. 3. With this construction, as the machine is drawn along a row of plants, the grain will be drilled into the soil upon both sides of the said row, and without doing any injury to the said plants.

Having thus fully described my invention, I claim as new and desire to secure by Letters Patent—

1. In a grain-drill, the combination, with the drive-wheels E, the adjustable crank-axles F, and the feed-shafts N, of the gear-wheels K L P, the swinging bars M, pivoted to the shafts N and carrying the gear-wheels L, and the springs O, attached to the outside rails of frame A, and bearing against the bars M, substantially as herein shown and described, whereby the said gear-wheels will be kept in gear, however the drive-wheels may be adjusted, as set forth.

2. In a grain-drill, the combination, with the crank-axles F, journaled in the side bars, A, and in the short bars G, secured thereto and carrying the wheels E, of the rigid levers H, secured to said axle between the bars A G, and provided with suitable locking devices, substantially as herein shown and described, whereby the axles can be readily turned to raise and lower the frame of the machine, as set forth.

3. In a grain-drill, the rectangular standards U, secured to the front bars of frame A at their forward extremities, and at their bends to vertical slotted arms V, which are in turn secured to the under sides of the rear bars of frame A, the circular colters pivoted at the lower ends of standards U, in combination with shoe S, connected to the lower ends of standards U by the bars X, and to their upper angular portion by the bars Y, substantially as specified.

ABRAM L. REESE.

Witnesses:
SYDNEY REESE,
ISAAC M. REESE.